United States Patent
Sun et al.

(10) Patent No.: US 9,430,198 B2
(45) Date of Patent: Aug. 30, 2016

(54) DATA PROCESSING METHOD AND APPARATUS

(71) Applicant: Huawei Technologies Co., Ltd., Shenzhen (CN)

(72) Inventors: Dongwang Sun, Beijing (CN); Jijun Wen, Beijing (CN); Chuanting Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/753,232

(22) Filed: Jun. 29, 2015

(65) Prior Publication Data

US 2015/0301810 A1     Oct. 22, 2015

Related U.S. Application Data

(63) Continuation of application No. PCT/CN2014/081141, filed on Jun. 30, 2014.

(30) Foreign Application Priority Data

Feb. 19, 2014 (CN) .......................... 2014 1 0055711

(51) Int. Cl.
  *G06F 9/45* (2006.01)
  *G06F 17/30* (2006.01)
  *G06F 21/62* (2013.01)

(52) U.S. Cl.
  CPC ............ *G06F 8/41* (2013.01); *G06F 17/30312* (2013.01); *G06F 21/6227* (2013.01)

(58) Field of Classification Search
  CPC .. G06F 9/5027; G06F 8/70; G06F 17/30557; G06F 8/41
  See application file for complete search history.

(56) References Cited

U.S. PATENT DOCUMENTS 5,619,696 A * 4/1997 Nakagawa ............ G06F 9/4426
                                                                    711/3
6,243,860 B1 * 6/2001 Holland .................... G06F 8/41
                                                                    717/111

(Continued)

FOREIGN PATENT DOCUMENTS

CN          1573759 A        2/2005
CN        101499093 A        8/2009

(Continued)

OTHER PUBLICATIONS

Partial English Translation and Abstract of Chinese Patent Application No. CN101504613A, Apr. 29, 2015, 3 pages.

(Continued)

*Primary Examiner* — Chameli Das
(74) *Attorney, Agent, or Firm* — Conley Rose, P.C.; Grant Rodolph

(57) ABSTRACT

A data processing method and apparatus, which relate to the computer field and are capable of effectively improving scalability of a database system. The data processing method includes: receiving source code of an external routine, where the source code of the external routine is compiled by using an advanced programming language; compiling the source code to obtain intermediate code, where the intermediate code is a byte stream identifiable to a virtual machine on any operating platform; converting, according to an instruction set on the operating platform, the intermediate code into machine code capable of running on the operating platform; and storing the machine code to a database. The data processing method and apparatus provided by the embodiments of the present invention are used to process data.

18 Claims, 7 Drawing Sheets

(56) References Cited

U.S. PATENT DOCUMENTS

| | | | |
|---|---|---|---|
| 6,711,579 B2 | 3/2004 | Balakrishnan | |
| 2003/0110467 A1* | 6/2003 | Balakrishnan | G06F 17/30557 717/104 |
| 2004/0225747 A1* | 11/2004 | Kadi | G06F 8/41 709/232 |
| 2004/0260691 A1 | 12/2004 | Desai et al. | |
| 2007/0038662 A1 | 2/2007 | Bendel et al. | |
| 2009/0083271 A1* | 3/2009 | Day | G06F 8/52 |
| 2009/0113402 A1 | 4/2009 | Chen et al. | |
| 2009/0241128 A1* | 9/2009 | Curbera | G06F 9/547 719/320 |
| 2010/0030745 A1 | 2/2010 | Adler | |
| 2011/0265069 A1* | 10/2011 | Fee | G06F 9/5027 717/151 |
| 2011/0296386 A1* | 12/2011 | Woollen | G06F 8/70 717/124 |
| 2012/0284696 A1 | 11/2012 | Koskinen et al. | |
| 2013/0124686 A1* | 5/2013 | Hurlin | G06F 11/3664 709/218 |

FOREIGN PATENT DOCUMENTS

| | | |
|---|---|---|
| CN | 101504613 A | 8/2009 |
| CN | 101836188 A | 9/2010 |
| CN | 102144230 A | 8/2011 |
| CN | 102419714 A | 4/2012 |
| CN | 103309779 A | 9/2013 |
| CN | 103838614 A | 6/2014 |
| WO | 2010014323 A1 | 2/2010 |

OTHER PUBLICATIONS

Partial English Translation and Abstract of Chinese Patent Application No. CN102419714A, Apr. 29, 2015, 5 pages.

Partial English Translation and Abstract of Chinese Patent Application No. CN103838614A, Apr. 29, 2015, 3 pages.

Foreign Communication From a Counterpart Application, PCT Application No. PCT/CN2014/081141, International Search Report dated Nov. 28, 2014, 8 pages.

Foreign Communication From a Counterpart Application, PCT Application No. PCT/CN2014/081141, Written Opinion dated Nov. 28, 2014, 5 pages.

Gendler-Fishman, M., et al., "A Compile-time Model for Safe Information Flow in Object-Oriented Databases," Jan. 1997, 15 pages.

Foreign Communication From a Counterpart Application, European Application No. 14856790.2, Extended European Search Report dated Mar. 17, 2016, 11 pages.

Foreign Communication From A Counterpart Application, European Application No. 201410055711.9, Chinese Office Action dated Jun. 20, 2016, 7 pages.

* cited by examiner

DATA PROCESSING METHOD AND APPARATUS

CROSS-REFERENCE TO RELATED APPLICATION

This application is a continuation of International Application No. PCT/CN2014/081141, filed on Jun. 30, 2014, which claims priority to Chinese Patent Application No. 201410055711.9, filed on Feb. 19, 2014, both of which are hereby incorporated by reference in their entireties.

TECHNICAL FIELD

The present invention relates to the computer field, and in particular, to a data processing method and apparatus.

BACKGROUND

An external routine (External Routine) is generally a program that is compiled by using an advanced programming language and may be embedded in a structured query language (SQL) statement. Source code of the external routine, after being compiled, may be invoked by a database management system, so that a database function is extended. A database system includes a database and a database management system, where the database is used to store data, and the database management system is used to operate, manage, and maintain the database. Generally, the database management system may be a structured query language database management system (MySQL) and so on, and the database may be a structured query language database (SQL Server), an Oracle database (Oracle), and so on, and the database provides extensive support for the advanced programming language, where the advanced programming language may be a C language, a C++ language, a JAVA language, a Common Business Oriented Language (COBOL), and so on.

In the prior art, the database system may compile, by using an embedded database management system and an embedded extended language compiling module, the source code of the external routine compiled by using the advanced programming language, to obtain target code of the external routine, where the database management system may be a MySQL, Teradata, and so on, and the extended language compiling module may be a DB2, a PostgreSQL, and so on. Then, the target code of the external routine is stored to the database according to a target name and target address set by a user, where the target name is used to uniquely identify the target code of the external routine, and the target address is used to identify an address of the target code of the external routine stored in the database, so that the target code of the external routine is invoked according to the target name and the target address. Alternatively, after the source code of the external routine is compiled by using a programming tool of the advanced programming language, the target code of the external routine is copied to the database according to the target name and target address set by the user, and it is necessary to register information such as the target name and target address with the database, so that the database management system identifies and invokes the target code of the external routine.

However, central processors on different operating platforms are different, and instruction sets of different central processors are also different. Therefore, the external routine compiled by using the advanced programming language, when running on different operating platforms, needs to be compiled by different compilers to obtain target code of the external routine which is suitable for running on a current operating platform, where the operating platform is hardware and/or software required for running the target code of the external routine. The instruction set is used to convert the external routine into the target code of the external routine which is suitable for running on the operating platform. For example, when an external routine is compiled into target code of an x86 version, the target code can only run on a central processor that supports an x86 instruction set. Therefore, different compilers need to be embedded into the database system to compile the source code of the external routine, which limits scalability of the database system, and a security problem exists when the external routine is compiled.

SUMMARY

Embodiments of the present invention provide a data processing method and apparatus, which can effectively improve scalability of a database system.

To achieve the foregoing objectives, the following technical solutions are adopted in embodiments of the present invention:

According to a first aspect, a data processing method is provided, including receiving source code of an external routine, where the source code of the external routine is compiled by using an advanced programming language, compiling the source code to obtain intermediate code, where the intermediate code is a byte stream identifiable to a virtual machine on any operating platform, converting, according to an instruction set on the operating platform, the intermediate code into machine code capable of running on the operating platform; and storing the machine code to a database.

According to the first aspect, in a first possible implementation manner, before the receiving source code of an external routine, the method further includes receiving a database access request sent by a first user equipment that sends the source code of the external routine, determining, according to the database access request, whether the first user equipment has a permission to access the database; and if the first user equipment has the permission to access the database, receiving the source code of the external routine sent by the first user equipment, so as to convert the source code into the machine code and store the machine code to the database.

With reference to the first aspect or the first possible implementation manner of the first aspect, in a second possible implementation manner, before the compiling the source code to obtain intermediate code, the method further includes checking whether a range of an object, in the database, accessed by the source code is in a preset range of an object accessed in the database, and if the range of the object, in the database, accessed by the source code is in the preset range of the object accessed in the database, compiling the source code to obtain the intermediate code.

With reference to the first aspect or the first possible implementation manner of the first aspect, in a third possible implementation manner, before the compiling the source code to obtain intermediate code, the method further includes checking whether an operation performed by the source code on an object in the database is a preset operation performed on the object in the database, where the operation includes modifying, adding, or deleting the object, and if the operation performed by the source code on the object in the database is the preset operation performed on the object in the database, compiling the source code to obtain the intermediate code.

With reference to the first aspect or any one of the first possible implementation manner to the third possible implementation manner of the first aspect, in a fourth possible implementation manner, after the compiling the source code to obtain intermediate code, the method further includes storing the intermediate code to the database.

With reference to the fourth possible implementation manner of the first aspect, in a fifth possible implementation manner, after the storing the intermediate code to the database, the method further includes generating a target name of the intermediate code, where the target name is used to uniquely identify the intermediate code, and generating a target address of the intermediate code, where the target address is used to identify an address of the intermediate code in the database.

With reference to the first aspect or any one of the first possible implementation manner to the fifth possible implementation manner of the first aspect, in a sixth possible implementation manner, after the storing the machine code to a database, the method further includes receiving a request, which is sent by a second user equipment, for invoking the external routine, determining, according to the request for invoking the external routine, whether the second user equipment has a permission to invoke the external routine, and if the second user equipment has the permission to invoke the external routine, running the machine code, so as to invoke the external routine from the database.

According to a second aspect, a data processing apparatus is provided, including a first receiving unit configured to receive source code of an external routine, where the source code of the external routine is compiled by using an advanced programming language, a compiling unit configured to compile the source code to obtain intermediate code, where the intermediate code is a byte stream identifiable to a virtual machine on any operating platform, a converting unit configured to convert, according to an instruction set on the operating platform, the intermediate code into machine code capable of running on the operating platform, and a storing unit configured to store the machine code to a database.

With reference to the second aspect, in a first possible implementation manner, the data processing apparatus further includes a second receiving unit configured to receive a database access request sent by a first user equipment that sends the source code of the external routine, and a first determining unit configured to determine, according to the database access request, whether the first user equipment has a permission to access the database, where the first receiving unit is specifically configured to receive, when the first determining unit determines that the first user equipment has the permission to access the database, the source code of the external routine sent by the first user equipment, so as to convert the source code into the machine code and store the machine code to the database.

With reference to the second aspect or the first possible implementation manner of the second aspect, in a second possible implementation manner, the data processing apparatus further includes a first checking unit configured to check whether a range of an object, in the database, accessed by the source code is in a preset range of an object accessed in the database, where the compiling unit is specifically configured to compile the source code to obtain the intermediate code when the first checking unit determines that the range of the object, in the database, accessed by the source code is in the preset range of the object accessed in the database.

With reference to the second aspect or the first possible implementation manner of the second aspect, in a third possible implementation manner, the data processing apparatus further includes a second checking unit configured to check whether an operation performed by the source code on an object in the database is a preset operation performed on the object in the database, where the operation includes modifying, adding, or deleting the object; where the compiling unit is specifically configured to compile the source code to obtain the intermediate code when the second checking unit determines that the operation performed by the source code on the object in the database is the preset operation performed on the object in the database.

With reference to the second aspect or any one of the first possible implementation manner to the third possible implementation manner of the second aspect, in a fourth possible implementation manner, the storing unit is further configured to store the intermediate code to the database.

With reference to the fourth possible implementation manner of the second aspect, in a fifth possible implementation manner, the data processing apparatus further includes a first generating unit configured to generate a target name of the intermediate code, where the target name is used to uniquely identify the intermediate code, and a second generating unit configured to generate a target address of the intermediate code, where the target address is used to identify an address of the intermediate code in the database.

With reference to the second aspect or any one of the first possible implementation manner to the fifth possible implementation manner of the second aspect, in a sixth possible implementation manner, the data processing apparatus further includes an invoking unit, where the second receiving unit is further configured to receive a request, which is sent by a second user equipment, for invoking the external routine, the first determining unit is further configured to determine, according to the request for invoking the external routine, whether the second user equipment has a permission to invoke the external routine, and the invoking unit is configured to run the machine code when the first determining unit determines that the second user equipment has the permission to invoke the external routine, so as to invoke the external routine from the database.

Embodiments of the present invention provide a data processing method and apparatus. The data processing method includes: receiving source code of an external routine, where the source code of the external routine is compiled by using an advanced programming language; compiling the source code to obtain intermediate code, where the intermediate code is a byte stream identifiable to a virtual machine on any operating platform; converting, according to an instruction set on the operating platform, the intermediate code into machine code capable of running on the operating platform; and storing the machine code to a database. In this way, the received source code of the external routine is compiled to obtain the intermediate code. In comparison with the prior art, the intermediate code is independent from the operating platform, and is a type of unified code for the operating platform, that is, a virtual machine on any operating platform can identify the intermediate code. Therefore, it is unnecessary to embed different compilers into a database system to compile the source code of the external routine, and convert, according to the instruction set on the operating platform, the intermediate code into the machine code capable of running on the operating platform. Thereby, scalability of the database system is effectively improved.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1A:
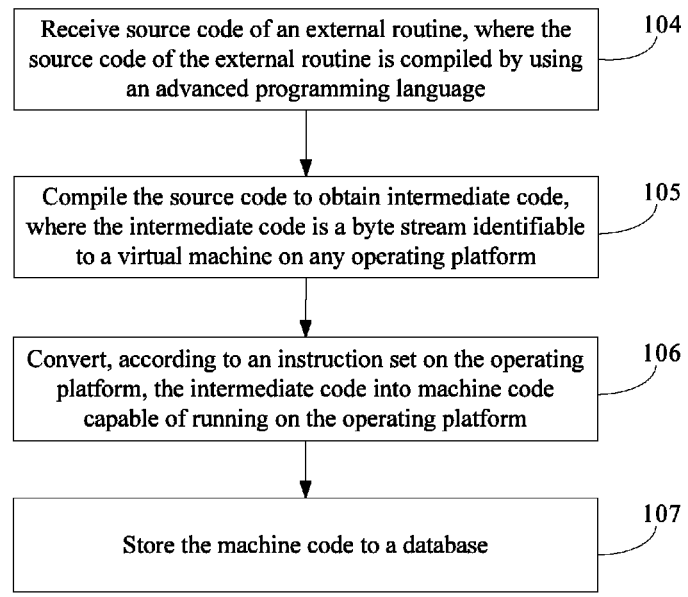
FIG. 1A is a flowchart of a data processing method according to an embodiment of the present invention.

As shown in FIG. 1A, an embodiment of the present invention provides a data processing method, including the following steps:

Step 104: Receive source code of an external routine, where the source code of the external routine is compiled by using an advanced programming language.

Step 105: Compile the source code to obtain intermediate code, where the intermediate code is a byte stream identifiable to a virtual machine on any operating platform.

When the source code of the external routine is compiled, first, whether a range of an object, in a database, accessed by the source code is in a preset range of an object accessed in the database is checked; and if the range of the object, in the database, accessed by the source code is in the preset range of the object accessed in the database, the source code is compiled to obtain the intermediate code. Alternatively, compiling the source code to obtain the intermediate code may further include: checking whether an operation performed by the source code on the object in a database is a preset operation performed on the object in the database, where the operation includes modifying, adding, or deleting the object; and if the operation performed by the source code on the object in the database is the preset operation performed on the object in the database, compiling the source code to obtain the intermediate code, so that the virtual machine on any operating platform can identify the intermediate code. After the source code is successfully compiled to obtain the intermediate code, the intermediate code is stored to the database, and a target name and a target address of the intermediate code are generated, where the target name is used to uniquely identify the intermediate code, and the target address is used to identify an address of the intermediate code in the database.

Step 106: Convert, according to an instruction set on the operating platform, the intermediate code into machine code capable of running on the operating platform.

The instruction set is a hardware program that is stored in a central processor and guides and optimizes an operation of the central processor, and the instruction set may enable the central processor to run more effectively.

Step 107: Store the machine code to a database.

A target name and a target address of the machine code are generated, where the target name is used to uniquely identify the machine code, and the target address is used to identify an address of the machine code in the database.

In this way, first, source code of an external routine is received, and then, the source code is compiled to obtain intermediate code, where the intermediate code is a byte stream identifiable to a virtual machine on any operating platform. In comparison with the prior art, the intermediate code is independent from the operating platform, and is a type of unified code for the operating platform, that is, the virtual machine on any operating platform can identify the intermediate code. Therefore, it is unnecessary to embed different compilers into a database system to compile the source code of the external routine, and convert, according to an instruction set on the operating platform, the intermediate code into machine code capable of running on the operating platform. Thereby, scalability of the database system is effectively improved.

Figure 1B:
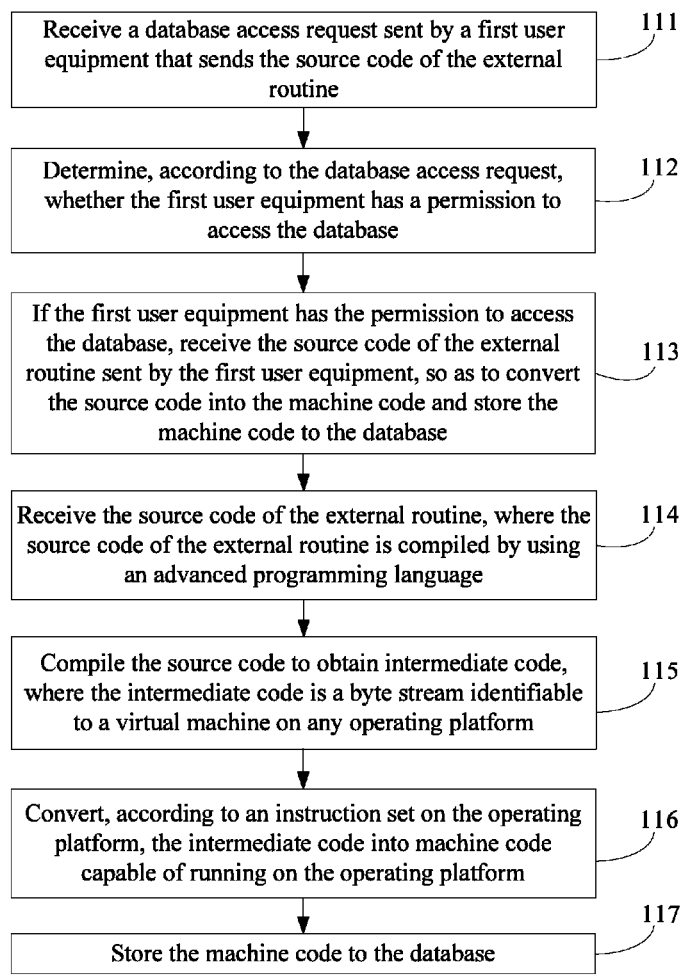
FIG. 1B is a flowchart of another data processing method according to an embodiment of the present invention.

As shown in FIG. 1B, an embodiment of the present invention provides a data processing method, including the following steps:

Step 111: Receive a database access request sent by a first user equipment that sends source code of an external routine.

Step 112: Determine, according to the database access request, whether the first user equipment has a permission to access a database.

Step 113: If the first user equipment has the permission to access the database, receive the source code of the external routine sent by the first user equipment, so as to convert the source code into machine code and store the machine code to the database.

If the first user equipment has the permission to access the database, the source code of the external routine sent by the first user equipment is received, which includes: parsing a data packet of the source code of the external routine to obtain a first identifier of the data packet, where the first identifier is used to identify a source address of the data packet; determining whether the first identifier of the data packet is a preset identifier, where the preset identifier is used to identify an address of the first user equipment; and if the first identifier of the data packet is the preset identifier, receiving a data packet sent by the first user equipment, where the data packet includes the source code of the external routine, where the source code of the external routine is compiled by using an advanced programming language, where the advanced programming language may be a C language, a C++ language, a JAVA language, and so on.

Step 114: Receive the source code of the external routine, where the source code of the external routine is compiled by using an advanced programming language.

Step 115: Compile the source code to obtain intermediate code, where the intermediate code is a byte stream identifiable to a virtual machine on any operating platform.

Step 116: Convert, according to an instruction set on the operating platform, the intermediate code into machine code capable of running on the operating platform.

Step 117: Store the machine code to the database.

In this way, before source code of an external routine is received, first, a database access request sent by a first user equipment that sends the source code of the external routine is received, and then after it is determined that the first user equipment has a permission to access a database, the source code of the external routine sent by the first user equipment is received, so that the source code is converted into a machine code and that the machine code is stored to the database. Thereby, security of the database is effectively enhanced, and the user equipment is prevented from unauthorizedly accessing the database.

Figure 2:
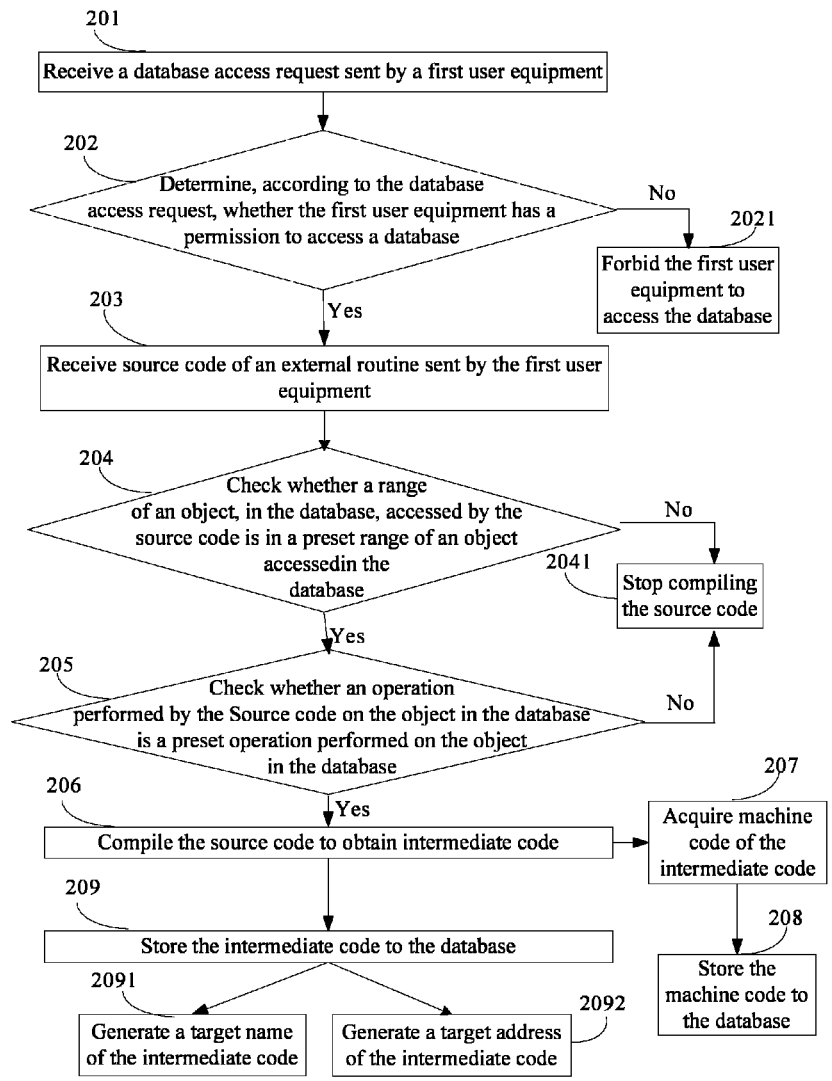
FIG. 2 is a flowchart of still another data processing method according to an embodiment of the present invention.

As shown in FIG. 2, an embodiment of the present invention provides a data processing method. It is assumed that source code of an external routine is compiled by using a C language, where the method includes the following steps:

Step 201: Receive a database access request sent by a first user equipment.

If a first user is a local user, the first user may send the database access request to a database by using the first user equipment, where the database access request sent by the first user equipment includes a user name, a login password, and a permission level. The user name is a login name used by the first user to log in to the database, the login password is a login password used by the first user to log in to the database, and the permission level is a level of an operation that can be performed by the first user on the database when the first user logs in to the database. For example, a permission level such as an administrator, a senior user, an intermediate user, or a junior user has different permissions to operate the database. Exemplarily, the administrator may add or delete a user to or from the database, and perform any compiling operation such as deleting, adding, or modifying on a source program or an object in the database; the senior user may invoke the source program in the database to perform any compiling operation such as deleting, adding, or modifying on the object in the database; the junior user may only access the object in the database.

If the first user is not a local user and needs to access the database remotely, the first user may first send, by using the first user equipment, an access request to a server on which the database is located, where the access request includes an Internet Protocol (IP) address and a port number of the server on which the database is located. After successfully accessing the server on which the database is located, the first user may send the database access request to the database again by using the first user equipment, and in this case, the database access request includes the user name, the login name, and the permission level.

It should be noted that the user may access the database in a form of command inputting in a disk operating system (DOS) environment, and may add, delete, or modify the source program or data in the database in the form of command inputting; the user may further access the database in a visual window interface.

Step 202: Determine, according to the database access request, whether the first user equipment has a permission to access a database.

If the first user equipment does not have the permission to access the database, step 2021 is performed to forbid the first user equipment to access the database.

If the first user equipment has the permission to access the database, step 203 is performed.

If the first user is not registered with the database, when the first user accesses the database by using the first user equipment, the database determines that the first user is an unauthorized user of the database, and forbids the first user to access the database by using the first user equipment.

If the first user equipment has the permission to access the database, that is, the first user is registered with the database by using the first user equipment, when the first user accesses the database by using the first user equipment, the database determines that the first user is an authorized user of the database, and allows the first user to access the database by using the first user equipment.

Specifically, if the first user equipment has the permission to access the database, the source code of the external routine sent by the first user equipment is received, which includes: parsing a data packet of the source code of the external routine to obtain a first identifier of the data packet, where the first identifier is used to identify a source address of the data packet, namely, an address of a user equipment sending the data packet; determining whether the first identifier of the data packet is a preset identifier, where the preset identifier is used to identify an address of the first user equipment; and if the first identifier of the data packet is the preset identifier, receiving a data packet sent by the first user equipment, where the data packet includes the source code of the external routine.

Step 2021: Forbid the first user equipment to access the database.

In the embodiment of the present invention, it is assumed that the first user equipment has the permission to access the database, and step 203 is performed.

Step 203: Receive source code of an external routine sent by the first user equipment.

Step 204: Check whether a range of an object, in the database, accessed by the source code is in a preset range of an object accessed in the database.

If the range of the object, in the database, accessed by the source code is in the preset range of the object accessed in the database, step 2041 is performed to stop compiling the source code.

For example, it is possible that the object, in the database, accessed by the source code includes an object forbidden to be accessed, causing unauthorized access to the object in the database. It is assumed that the object accessed by the source code is critical business data, leak of a major business secret may be caused, resulting in serious economic losses. If the range of the object, in the database, accessed by the source code is in the preset range of the object accessed in the database, the source code is compiled to obtain an intermediate code.

Specifically, first, a permission level of the object in the database is preset. Objects of different permission levels are of different importance, that is, permission levels of the objects may be set to confidential, high-level, or low-level, and so on. For example, a confidential object cannot be accessed randomly, and can only be accessed by a program or user having a confidential permission. The object may be data in the database. Alternatively, data stored in the database may be classified into different types of objects, where each type of data is a type of object, for example, a data type and an information type. Then, after receiving the source code of the external routine, when compiling the source code, the database checks whether an object, in the database, accessed by the source program is a preset object in the database allowed to be accessed; compiles the source code to obtain the intermediate code if the object, in the database, accessed by the source program is the preset object in the database allowed to be accessed; and stops compiling the source code if the object, in the database, accessed by the source program is a preset object in the database not allowed to be accessed.

Further, if the range of the object, in the database, accessed by the source code is in the preset range of the object accessed in the database, step 205 is performed to check whether an operation performed by the source code on the object in the database is a preset operation performed on the object in the database.

Step 2041: Stop compiling the source code.

In the embodiment of the present invention, it is assumed that the range of the object, in the database, accessed by the source code is in the preset range of the object accessed in the database, and step 205 is performed.

Step 205: Check whether an operation performed by the source code on the object in the database is a preset operation performed on the object in the database.

If it is determined that the operation performed by the source code on the object in the database is not the preset operation performed on the object in the database, step 2041 is performed to stop compiling the source code.

If it is checked that the operation performed by the source code on the object in the database is the preset operation performed on the object in the database, step 206 is performed.

Specifically, first, a permission to operate the object in the database is preset, where the operation includes modifying, adding, or deleting the object. That is, some important objects in the database may be accessed but any operation such as modifying cannot be performed on the objects, where the important objects are objects of a confidential or high permission level; some ordinary objects may be accessed and any operation such as modifying, deleting, or adding may also be performed on the objects, where the ordinary objects are objects of a low permission level. Then, if the object, in the database, accessed by the source code is the preset object in the database allowed to be accessed, it is checked whether the operation performed by the source code on the object in the database is the preset operation performed on the object in the database; if the operation performed by the source code on the object in the database is the preset operation performed on the object in the database, the source code is compiled to obtain the intermediate code; if the operation performed by the source code on the object in the database is not the preset operation performed on the object in the database, compiling of the source code is stopped.

Exemplarily, it is assumed that the source code of the external routine is used to calculate actually paid after-tax salaries of company employees whose basic salaries are higher than 3500 Renminbi (RMB). Specifically, it is assumed that the source code can access basic salaries of all employees in the database, where the basic salaries of the employees include 1000 to 5000. However, only data of basic salaries of employees which are higher than 3500 among the basis salaries of all the employees is calculated, and the actually paid after-tax salaries are obtained. If the source code calculates the basic salaries of all the employees to obtain actually paid after-tax salaries, a salary actually received by an employee whose basic salary is lower than 3500 is an actually paid after-tax salary, which does not comply with stipulations of the country, and causes an error in issuing the salary of the employee.

In the prior art, when the source code of the external routine is compiled, it is unnecessary to check the range of the object, in the database, accessed by the source code of the external routine, and the operation performed by the source code of the external routine on the object in the database is also not checked; therefore, stability of the object in the database may be affected, or data is inconsistent when another source program in the database makes reference to the source program.

In the data processing method according to the embodiment of the present invention, first, a permission level of an object in the database is set, and an operation on the object is set. When the source code of the external routine is compiled, by checking the range of the object, in the database, accessed by the source code of the external routine and checking the operation performed by the source code of the external routine on the object in the database, it is determined whether the range and the operation comply with the preset permission to access the object in the database and the preset operation performed on the object in the database, which effectively enhances operation security of the database and security of data in the database.

In the embodiment of the present invention, it is assumed that the operation performed by the source code on the object in the database is the preset operation performed on the object in the database, step 206 is performed to compile the source code to obtain the intermediate code.

Step 206: Compile the source code to obtain intermediate code.

Specifically, a language front-end module may be used to compile the source code to obtain the intermediate code, where the language front-end module may be a C language front-end module, a Python language front-end module, or a Fortran language front-end module, and so on.

In the embodiment of the present invention, it is assumed that the source code of the external routine is compiled by using the C language, a C language front-end module is used to parse the source code to obtain a parse tree, and then the parse tree is compiled to obtain the intermediate code, so that a virtual machine on any operating platform can identify the intermediate code. The parse tree includes a root node, a root element node, a node, and so on. That is, the source code is analyzed, and the process of generating the parse tree pertains to the prior art, which is not further described herein in the embodiment of the present invention.

Particularly, after the source code is compiled to obtain the intermediate code, step 209 is performed to store the intermediate code to the database, or the intermediate code may also be converted into machine code and step 207 is performed.

Step 207: Acquire machine code of the intermediate code.

The operating platform includes an integrated circuit chipset using a central processor as a core, where an instruction set on any operating platform is packaged for a virtual machine on the operating platform. The instruction set is a hardware program that is stored in the central processor and guides and optimizes an operation of the central processor, and the instruction set may enable the central processor to run more effectively. The machine code of the intermediate code is acquired by using the operating platform. The operating platform may be an x86 operating platform, a performance optimization with enhanced reduced instruction set computing (RISC)—performance computing (PowerPC) operating platform, an Acorn RISC Machine (ARM) operating platform, and so on. Specifically, the intermediate code of the external routine generated by the language front-end module may be input to the operating platform, and the operating platform may convert the intermediate code of the external routine into machine code that is suitable for running on an operating platform such as the x86 operating platform, the PowerPC operating platform, or the ARM operating platform, that is, machine code run by each operating platform is different.

Step 208: Store the machine code to the database.

After the machine code of the intermediate code is acquired, similarly, the database may generate a target name of the machine code, where the target name is used to uniquely identify the machine code, and generate a target address of the machine code, where the target address is used to identify an address of the machine code in the database. The target name and the target address are invisible to the user and are stored in the database. When the machine code of the external routine is invoked, the machine code of the external routine is invoked according to the target name and the target address.

Step 209: Store the intermediate code to the database.

Step 2091: Generate a target name of the intermediate code.

The target name is used to uniquely identify the intermediate code.

Step 2092: Generate a target address of the intermediate code.

The target address is used to identify an address of the intermediate code in the database.

It should be noted that when step 2091 and step 2092 are performed, there may be no sequence for differentiation, that is, the target address of the intermediate code may be generated first, and then the target name of the intermediate code is generated.

Particularly, when the database generates the target name and the target address of the intermediate code, to better ensure security of the intermediate code of the external routine, a creator who compiles the external routine may further set an invoking password, that is, only a user who has both the invoking password and a permission to invoke the intermediate code of the external routine may invoke the intermediate code of the external routine.

In the prior art, after the source code of the external routine is compiled, the target code of the external routine is obtained; when the target code of the external routine is stored to the database, the target name and the target address set by the user need to be received; the target code of the external routine is stored to the database according to the target name and the target address. Therefore, risks such as deleting, replacing, or tampering the target code of the external routine may exist when the target code of the external routine is managed.

In the data processing method according to the embodiment of the present invention, when the intermediate code of the external routine is stored to the database, the database generates the target name of the intermediate code, where the target name is used to uniquely identify the intermediate code, and generates the target address of the intermediate code, where the target address is used to identify the address of the intermediate code in the database. The target name and the target address are invisible to the user and are stored in the database. When the intermediate code of the external routine is invoked, the intermediate code of the external routine is invoked according to the target name and the target address. Therefore, the intermediate code of the external routine is stored and managed by using a method controlled by the database, which may effectively avoid the risks such as deleting, replacing, or tampering the external routine when the intermediate code of the external routine is managed, and not only improve rigorousness of management but also improve security of data in the database.

The source code of the external routine in the embodiment of the present invention is only exemplary, and in an actual application, the source code may also be compiled by using another advanced programming language, where a process of compiling source code of an external routine compiled by using the another advanced programming language to obtain intermediate code and then converting the intermediate code into machine code is the same as the method in the embodiment of the present invention, and is not further described herein.

In the data processing method according to the embodiment of the present invention, first, a database access request sent by a first user equipment is received; it is determined, according to the database access request, whether the first user equipment has a permission to access a database; if the first user equipment has the permission to access the database, source code of an external routine sent by the first user equipment is received; then, when the source code is compiled, it is checked whether a range of an object, in the database, accessed by the source code is in a preset range of an object accessed in the database; if the range of the object in the database accessed by the source code is in the preset range of the object accessed in the database, the source code is compiled to obtain intermediate code, and meanwhile, it may also be checked whether an operation performed by the source code on the object in the database is a preset operation performed on the object in the database; if the operation performed by the source code on the object in the database is the preset operation performed on the object in the database, the source code is compiled to obtain the intermediate code; machine code of the intermediate code is acquired; the machine code is stored to the database; and meanwhile, the intermediate code is stored to the database. In comparison with the prior art, the intermediate code is independent from an operating platform, and is a type of unified code for the operating platform, that is, a virtual machine on any operating platform can identify the intermediate code. Therefore, it is unnecessary to embed different compilers into a database system to compile the source code of the external routine, and convert, according to an instruction set on the operating platform, the intermediate code into the machine code capable of running on the operating platform. Thereby, scalability of the database system is effectively improved. Meanwhile, when the source code is compiled, checking the range of the object, in the database, accessed by the source code and checking an operation of accessing the object in the database by the source code effectively enhance operation security of the database and security of data in the database. In addition, the intermediate code and the machine code of the external routine are stored and managed by using a method controlled by the database, which effectively avoids risks such as deleting, replacing, or tampering the external routine when the intermediate code and the machine code of the external routine are managed, and not only improves rigorousness of management but also improves the security of the data in the database.

Figure 3:
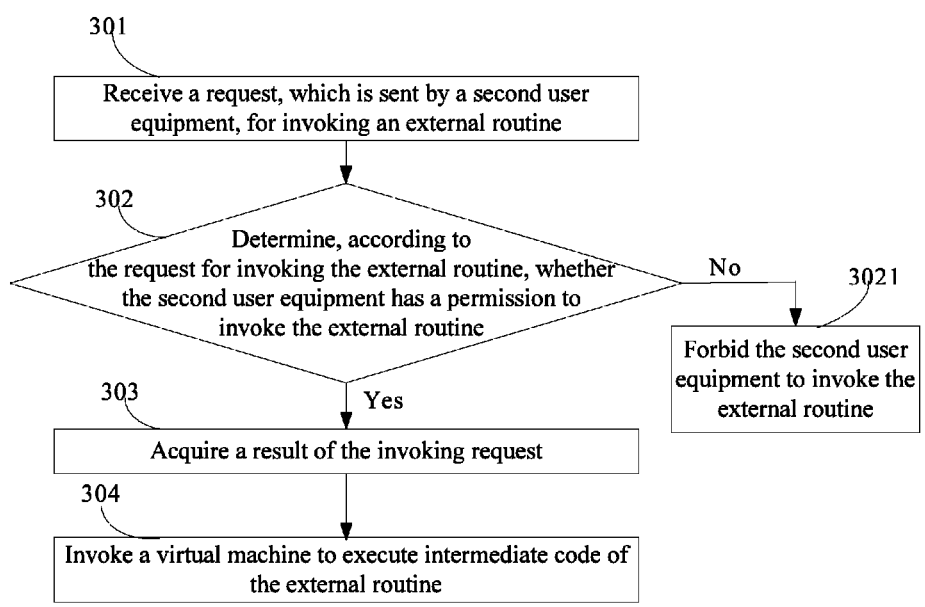
FIG. 3 is a flowchart of yet another data processing method according to an embodiment of the present invention.

As shown in FIG. 3, an embodiment of the present invention provides a data processing method. It is assumed that a database stores intermediate code of an external routine, and the external routine is compiled by using a C language, where the method includes the following steps:

Step 301: Receive a request, which is sent by a second user equipment, for invoking an external routine.

It is assumed that a second user is registered with the database by using the second user equipment. When the second user accesses the database by using the second user equipment, the database determines that the second user is an authorized user of the database, and allows the second user to access the database by using the second user equipment. Then, when the second user needs to invoke the external routine, the second user may send, by using the second user equipment, the request for invoking the external routine to the database, and the database receives the request, which is sent by the second user equipment, for invoking the external routine, is received.

Step 302: Determine, according to the request for invoking the external routine, whether the second user equipment has a permission to invoke the external routine.

An administrator of the database may set a permission of the second user in the database. If the second user equipment does not have the permission to invoke the external routine, the second user who invokes the source program is an unauthorized user, and step 3021 is performed.

If the second user equipment has the permission to invoke the external routine, the external routine is invoked from the database. It should be noted that the database stores a function name of the external routine. The external routine may be invoked according to the function name of the external routine. Then, inside the database, according to a target name and a target address of intermediate code or machine code of the stored external routine, the intermediate code or the machine code of the external routine is invoked to run the external routine, so as to return an invoking result to a user.

Step 3021: Forbid the second user equipment to invoke the external routine.

A database system may prompt the second user equipment with an operation error, and forbid the second user equipment to invoke the external routine.

Exemplarily, it is assumed that the external routine is a program that needs to be used when a financial personnel in a financial department of a company prepares salaries. When the financial personnel in the financial department of the company prepares salaries of company employees in a current month every month, the external routine may be invoked to calculate and modify the salaries of the employees, and then an employee payroll is stored to the database, where the employee payroll includes a salary of every employee in the company in the current month. The administrator of the database specifies that: only the financial personnel who prepares the employee payroll and Chairman of the Board of the company may access the employee payroll in the database by using a user equipment, and may perform an operation such as modifying on the employee payroll by invoking the external routine, and a department leader of the company may access, by using the user equipment, the database to view salaries of employees in the department and a salary of this department leader in the employee payroll, but cannot invoke the external routine to perform an operation such as modifying on the salaries of the employees in the department and the salary of this department leader, and ordinary employees in the company can only access, by using the user equipment, the database to view their own salaries in the employee payroll, and cannot invoke the external routine to perform an operation such as modifying on their own salaries, either.

In the embodiment of the present invention, it is assumed that the second user equipment has the permission to invoke the external routine, and step 303 is performed.

Step 303: Acquire a result of the invoking request.

Step 304: Invoke a virtual machine to execute intermediate code of the external routine.

When the result of the invoking request is the intermediate code of the external routine, a virtual machine on an operating platform is invoked to execute the intermediate code of the external routine.

In the prior art, when the user invokes the external routine by using the user equipment, a user permission to invoke the external routine does not need to be determined, and the external routine is directly invoked, which may affect security or stability of an object in the database.

In the data processing method according to the embodiment of the present invention, when the user invokes the external routine by using the user equipment, first, the user permission to invoke the external routine needs to be determined, and only a user who has the permission to invoke the external routine can invoke the external routine by using the user equipment. In comparison with the prior art, before the user equipment invokes the external routine, a step of determining a user invoking permission is added, which effectively improves security or stability of the object in the database.

Exemplarily, it is assumed that the database is a structured query language (SQL) database. When a user equipment A needs to access the SQL database, first, a server on which the SQL database is installed checks whether the user equipment A has a permission to connect to the SQL database, and if the user equipment A has the permission to connect to the SQL database, after the user equipment A successfully accesses the SQL database, the SQL database checks again whether the user has a permission to log in to the SQL database; if the user has the permission to log in to the SQL database, the user may operate an object in the SQL database; then, the SQL database determines whether the user has a permission to operate the object. For example, if a table needs to be updated or queried, the SQL database determines a permission of the user to the table, or the user needs to run a stored procedure, and the SQL database determines whether the user has a permission to execute the stored procedure. For example, a permission of the SQL database is shown in Table 1.

TABLE 1

Permission of the SQL Server database

| Permission level | Permission |
|---|---|
| Database, table, or index | CREATE (create a database, a table, or an index) |
| Database or table | DROP(delete a database or a table) |
| Database, table, or stored program | GRANT OPTION (grant a permission option) |
| Table | ALTER (alter a table, such as adding a field and an index) |
| Table | DELETE (delete data) |
| Table | Index (index) |
| Table | INSERT (insert) |
| Table | SELECT (query) |
| Table | UPDATE (update) |

TABLE 1-continued

Permission of the SQL Server database

| Permission level | Permission |
| --- | --- |
| View | CREATE VIEW (create a view) |
| View | SHOW VIEW (show a view) |
| Stored procedure | ALTER ROUTINE (alter a stored procedure) |
| Stored procedure | CREATE ROUTINE (create a stored procedure) |
| Stored procedure | EXECUTE (execute a stored procedure) |
| File access on a server host | FILE (file access) |
| Server management | CREATE TEMPORARY TABLES (create a temporary table) |
| Server management | LOCK TABLES (lock a table) |
| Server management | CREATE USER (create a user) |
| Server management | PROCESS (show a process) |
| Server management | RELOAD (execute a reloading command) |
| Server management | REPLICATION CLIENT (replicate) |
| Server management | REPLICATION SLAVE (replicate) |
| Server management | SHOW DATABASES (show a database) |
| Server management | SHUTDOWN (shut down a database) |
| Server management | SUPER (execute a thread) |

In the data processing method according to the embodiment of the present invention, first, a request, which is sent by a second user equipment, for invoking an external routine is received; then, it is determined, according to the request for invoking the external routine, whether the second user equipment has a permission to invoke the external routine; if the second user equipment has the permission to invoke the external routine, the external routine is invoked from a database to acquire a result of the invoking request; and a virtual machine is invoked to execute intermediate code of the external routine. In comparison with the prior art, when a user equipment invokes the external routine, a step of determining a user invoking permission is added, which effectively improves security or stability of an object in the database.

Figure 4:
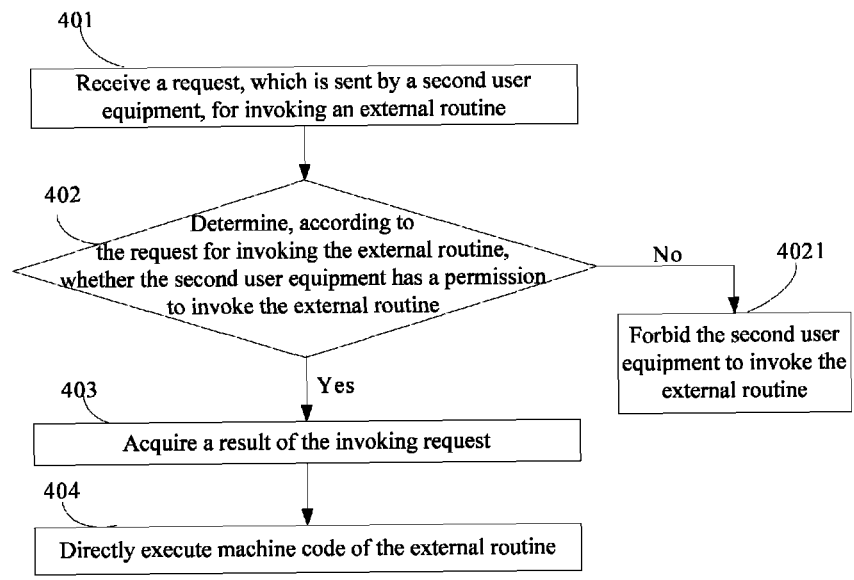
FIG. 4 is a flowchart of yet another data processing method according to an embodiment of the present invention.

As shown in FIG. 4, an embodiment of the present invention provides a data processing method. It is assumed that a database stores machine code of an external routine, and the external routine is compiled by using a C language, where the method includes the following steps:

Step 401: Receive a request, which is sent by a second user equipment, for invoking an external routine.

It is assumed that a second user is registered with the database by using the second user equipment, when the second user accesses the database by using the second user equipment, the database determines that the second user is an authorized user of the database, and allows the second user to access the database by using the second user equipment. Then, when the second user needs to invoke the external routine, the second user may send, by using the second user equipment, the request for invoking the external routine to the database, and the database receives the request, which is sent by the second user equipment, for invoking the external routine, is received.

Step 402: Determine, according to the request for invoking the external routine, whether the second user equipment has a permission to invoke the external routine.

An administrator of the database may set a permission of the second user in the database. If the second user equipment does not have the permission to invoke the external routine, the second user who invokes the source program is an unauthorized user, and step 4021 is performed.

If the second user equipment has the permission to invoke the external routine, the external routine is invoked from the database. It should be noted that the database stores a function name of the external routine. The external routine may be invoked according to the function name of the external routine. Then, inside the database, according to a target name and a target address of intermediate code or machine code of the stored external routine, the intermediate code or the machine code of the external routine is invoked to run the external routine, so as to return an invoking result to a user.

Step 4021: Forbid the second user equipment to invoke the external routine.

A database system may prompt the second user equipment with an operation error, and forbid the second user equipment to invoke the external routine.

In the embodiment of the present invention, it is assumed that the second user equipment has the permission to invoke the external routine, and step 403 is performed.

Step 403: Acquire a result of the invoking request.

Step 404: Directly execute machine code of the external routine.

When the result of the invoking request is the machine code of the external routine, an operating platform corresponding to the machine code is used to run the machine code of the external routine.

In the prior art, when the user invokes the external routine by using the user equipment, a user permission to invoke the external routine does not need to be determined, and the external routine is directly invoked, which may affect security or stability of an object in the database.

In the data processing method according to the embodiment of the present invention, when the user invokes the external routine by using the user equipment, first, the user permission to invoke the external routine needs to be determined, and only a user who has the permission to invoke the external routine can invoke the external routine by using the user equipment. In comparison with the prior art, before the user equipment invokes the external routine, a step of determining a user invoking permission is added, which effectively improves security or stability of an object in the database.

In the data processing method according to the embodiment of the present invention, first, a request, which is sent by a second user equipment, for invoking an external routine is received; then, it is determined, according to the request for invoking the external routine, whether the second user equipment has a permission to invoke the external routine; if the second user equipment has the permission to invoke the external routine, the external routine is invoked from a database; a result of the invoking request is acquired; and machine code of the external routine is directly executed. In comparison with the prior art, when a user equipment invokes the external routine, a step of determining a user invoking permission is added, which effectively improves security or stability of an object in the database.

Figure 5:
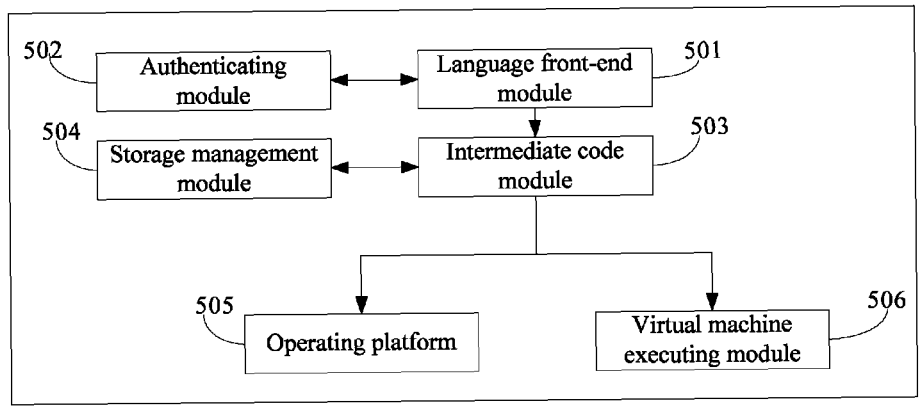
FIG. 5 is a schematic structural diagram of a data processing apparatus according to an embodiment of the present invention.

Exemplarily, as shown in FIG. 5, a process of compiling source code of an external routine to obtain intermediate code or machine code and running the intermediate code or the machine code is described by using a logical frame diagram of the external routine. First, the source code of the external routine is input to a language front-end module 501; the language front-end module 501 parses and compiles the source code to obtain a parse tree, and compiles the parse tree; meanwhile, an authenticating module 502 determines whether an operation or access and so on performed by the source code on an object in a database is secure; if the operation or the access and so on performed by the source code on the object in the database is secure, the intermediate code of the source code is obtained; then, the intermediate code is input to an intermediate code module 503; the intermediate code module 503 stores, by using a storage management module 504, the intermediate code of the source code to the database; finally, the intermediate code module 503 inputs the intermediate code of the source code to an operating platform 505; the operating platform 505 converts the intermediate code of the source code into the machine code, so as to execute the external routine on the operating platform to obtain an expected result. Alternatively, if the intermediate code of the source code is not converted into the machine code, when the external routine needs to be invoked, the intermediate code of the source code is input to a virtual machine executing module 506, and the virtual machine executing module 506 executes the machine code when converting the intermediate code of the source code into the machine code.

It should be noted that the language front-end module 501 may be a language front-end module such as a C language front-end module, a Python language front-end module, or a Fortran language front-end module, and so on. The operating platform 505 may be an x86 operating platform, a PowerPC operating platform, or an ARM operating platform, and so on, and machine code run on each operating platform is different.

Figure 6A:
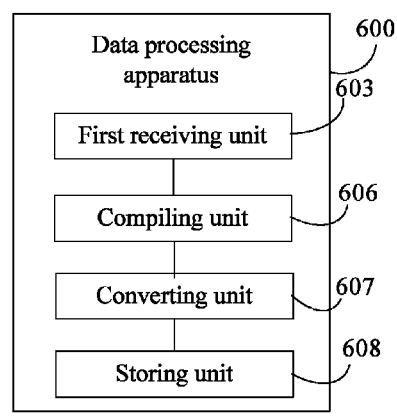
FIG. 6A is a schematic structural diagram of another data processing apparatus according to an embodiment of the present invention.

As shown in FIG. 6A, an embodiment of the present invention provides a data processing apparatus 600, including a first receiving unit 603 configured to receive source code of an external routine, where the source code of the external routine is compiled by using an advanced programming language, a compiling unit 606 configured to compile the source code to obtain intermediate code, where the intermediate code is a byte stream identifiable to a virtual machine on any operating platform, a converting unit 607 configured to convert, according to an instruction set on the operating platform, the intermediate code into machine code capable of running on the operating platform, and a storing unit 608 configured to store the machine code to a database.

In this way, first, source code of an external routine is received, and then, the source code is compiled to obtain intermediate code, where the intermediate code is a byte stream identifiable to a virtual machine on any operating platform. In comparison with the prior art, the intermediate code is independent from the operating platform, and is a type of unified code for the operating platform, that is, the virtual machine on any operating platform can identify the intermediate code. Therefore, it is unnecessary to embed different compilers into a database system to compile the source code of the external routine, and convert, according to an instruction set on the operating platform, the intermediate code into the machine code capable of running on the operating platform. Thereby, scalability of the database system is effectively improved.

Figure 6B:
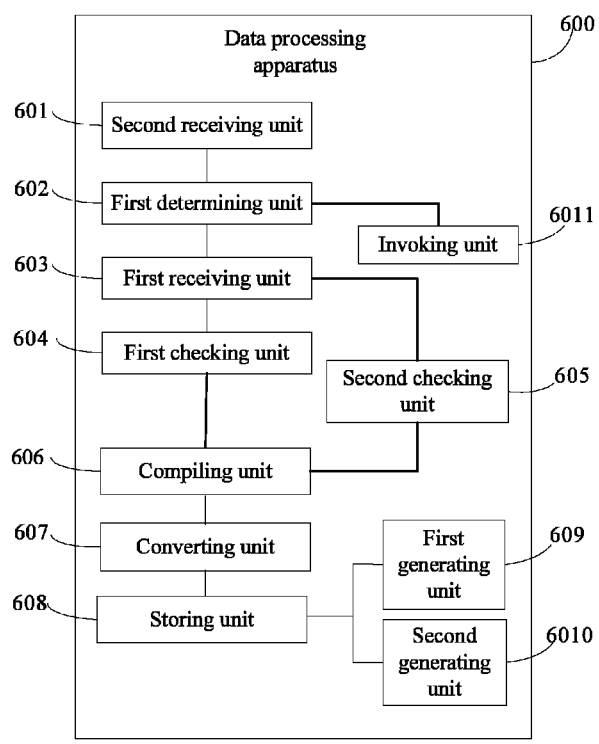
FIG. 6B is a schematic structural diagram of still another data processing apparatus according to an embodiment of the present invention.

As shown in FIG. 6B, the data processing apparatus 600 further includes a second receiving unit 601 configured to receive a database access request sent by a first user equipment that sends the source code of the external routine, and a first determining unit 602 configured to determine, according to the database access request, whether the first user equipment has a permission to access the database.

The first receiving unit 603 is specifically configured to receive, when the first determining unit 602 determines that the first user equipment has the permission to access the database, the source code of the external routine sent by the first user equipment, so that the converting unit 607 converts the source code into the machine code and stores the machine code to the database.

The data processing apparatus 600 further includes a first checking unit 604 configured to check whether a range of an object, in the database, accessed by the source code is in a preset range of an object accessed in the database.

The compiling unit 606 is specifically configured to compile the source code to obtain the intermediate code when the first checking unit 604 determines that the range of the object, in the database, accessed by the source code is in the preset range of the object accessed in the database.

The data processing apparatus 600 further includes a second checking unit 605 configured to check whether an operation performed by the source code on an object in the database is a preset operation performed on the object in the database, where the operation includes modifying, adding, or deleting the object.

The compiling unit 606 is specifically configured to compile the source code to obtain the intermediate code when the second checking unit 605 determines that the operation performed by the source code on the object in the database is the preset operation performed on the object in the database.

The storing unit 608 is further configured to store the intermediate code to the database.

The data processing apparatus 600 further includes a first generating unit 609 configured to generate a target name of the intermediate code, where the target name is used to uniquely identify the intermediate code, and a second generating unit 6010 configured to generate a target address of the intermediate code, where the target address is used to identify an address of the intermediate code in the database.

It should be noted that after the storing unit 608 stores the intermediate code to the database, at the same time when the first generating unit 609 generates the target name of the intermediate code, where the target name is used to uniquely identify the intermediate code, the second generating unit 6010 may generate the target address of the intermediate code, where the target address is used to identify the address of the intermediate code in the database, without differentiating a sequence of generating the target name and generating the target address.

The data processing apparatus 600 further includes an invoking unit 6011.

The second receiving unit 601 is further configured to receive a request, which is sent by a second user equipment, for invoking the external routine.

The first determining unit 602 is further configured to determine, according to the request for invoking the external routine, whether the second user equipment has a permission to invoke the external routine.

The invoking unit 6011 is configured to run the machine code when the first determining unit 602 determines that the second user equipment has the permission to invoke the external routine, so as to invoke the external routine from the database.

In the data processing apparatus according to the embodiment of the present invention, first, a database access request sent by a first user equipment is received; it is determined, according to the database access request, that the first user equipment has a permission to access a database, and source code of an external routine is received; then, when the source code is compiled, it is checked that a range of an object, in the database, accessed by the source code is in a preset range of an object accessed in the database, and the source code is compiled to obtain intermediate code; and meanwhile, it may also be checked that an operation performed by the source code on the object in the database is a preset operation performed on the object in the database;

the source code is compiled to obtain the intermediate code; machine code of the intermediate code is acquired; and the machine code is stored to the database; and meanwhile, after the machine code or the intermediate code of the external routine is stored, and when it is determined that a second user equipment has a permission to invoke the external routine, the machine code or the intermediate code is run, so as to invoke the external routine from the database. In comparison with the prior art, the intermediate code is independent from an operating platform, and is a type of unified code for the operating platform, that is, a virtual machine on any operating platform can identify the intermediate code. Therefore, it is unnecessary to embed different compilers into a database system to compile the source code of the external routine, and convert, according to an instruction set on the operating platform, the intermediate code into the machine code capable of running on the operating platform. Thereby, scalability of the database system is effectively improved. Meanwhile, when the source code is compiled, checking the range of the object, in the database, accessed by the source code and checking an operation of accessing the object in the database by the source code effectively enhance operation security of the database and security of data in the database. In addition, the intermediate code and the machine code of the external routine are stored and managed by using a method controlled by the database, which effectively avoids risks such as deleting, replacing, or tampering the external routine when the intermediate code and the machine code of the external routine are managed, and not only improves rigorousness of management but also improves the security of the data in the database.

Figure 7:
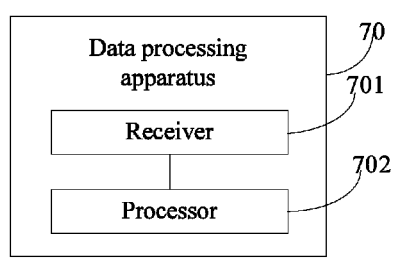
FIG. 7 is a schematic structural diagram of yet another data processing apparatus according to an embodiment of the present invention.

As shown in FIG. 7, an embodiment of the present invention provides a data processing apparatus 70, including a receiver 701 configured to receive source code of an external routine, where the source code of the external routine is compiled by using an advanced programming language, and a processor 702 configured to compile the source code to obtain intermediate code, where the intermediate code is a byte stream identifiable to a virtual machine on any operating platform.

The processor 702 is further configured to convert, according to an instruction set on the operating platform, the intermediate code into machine code capable of running on the operating platform.

The processor 702 is further configured to store the machine code to a database.

In this way, first, source code of an external routine is received, and then, the source code is compiled to obtain intermediate code, where the intermediate code is a byte stream identifiable to a virtual machine on any operating platform. In comparison with the prior art, the intermediate code is independent from the operating platform, and is a type of unified code for the operating platform, that is, a virtual machine on any operating platform can identify the intermediate code. Therefore, it is unnecessary to embed different compilers into a database system to compile the source code of the external routine, and convert, according to an instruction set on the operating platform, the intermediate code into the machine code capable of running on the operating platform. Thereby, scalability of the database system is effectively improved.

The receiver 701 is further configured to receive a database access request sent by a first user equipment that sends the source code of the external routine.

The processor 702 is further configured to determine, according to the database access request, whether the first user equipment has a permission to access the database.

The processor 702 is further configured to receive, when the processor 702 determines that the first user equipment has the permission to access the database, the source code of the external routine sent by the first user equipment, so as to convert the source code into the machine code and store the machine code to the database.

Specifically, the processor 702 parses a data packet of the source code of the external routine to obtain a first identifier of the data packet, where the first identifier is used to identify a source address of the data packet; and then determines whether the first identifier of the data packet is a preset identifier, where the preset identifier is used to identify an address of the first user equipment.

The processor 702 is further configured to check whether a range of an object, in the database, accessed by the source code is in a preset range of an object accessed in the database.

The processor 702 is specifically configured to compile the source code to obtain the intermediate code when the processor 702 determines that the range of the object, in the database, accessed by the source code is in the preset range of the object accessed in the database.

The processor 702 is further configured to check whether an operation performed by the source code on the object in the database is a preset operation performed on the object in the database, where the operation includes modifying, adding, or deleting the object.

The processor 702 is specifically configured to compile the source code to obtain the intermediate code when the processor 702 determines that the operation performed by the source code on the object in the database is the preset operation performed on the object in the database.

The processor 702 is further configured to store the intermediate code to the database.

The processor 702 is further configured to generate a target name of the intermediate code, where the target name is used to uniquely identify the intermediate code.

The processor 702 is further configured to generate a target address of the intermediate code, where the target address is used to identify an address of the intermediate code in the database.

The receiver 701 is further configured to receive a request, which is sent by a second user equipment, for invoking the external routine.

The processor 702 is further configured to determine, according to the request for invoking the external routine, whether the second user equipment has a permission to invoke the external routine.

The processor 702 is further configured to run the machine code when the processor 702 determines that the second user equipment has the permission to invoke the external routine, so as to invoke the external routine from the database.

In the data processing apparatus according to the embodiment of the present invention, first, a database access request sent by a first user equipment is received; it is determined, according to the database access request, that the first user equipment has a permission to access a database, and source code of an external routine is received; then, when the source code is compiled, it is checked that a range of an object, in the database, accessed by the source code is in a preset range of an object accessed in the database; the source code is compiled to obtain intermediate code; and meanwhile, it may also be checked that an operation performed by the source code on the object in the database is a preset operation performed on the object in the database; the source code is compiled to obtain the intermediate code; machine code of the intermediate code is acquired; and the machine code is stored to the database; and meanwhile, after the intermediate code or the machine code of the external routine is stored, and when it is determined that a second user equipment has a permission to invoke the external routine, the machine code or the intermediate code is run, so as to invoke the external routine from the database. In comparison with the prior art, the intermediate code is independent from an operating platform, and is a type of unified code for the operating platform, that is, a virtual machine on any operating platform can identify the intermediate code. Therefore, it is unnecessary to embed different compilers into a database system to compile the source code of the external routine, and convert, according to an instruction set on the operating platform, the intermediate code into the machine code capable of running on the operating platform. Thereby, scalability of the database system is effectively improved. Meanwhile, when the source code is compiled, checking the range of the object, in the database, accessed by the source code and checking an operation of accessing the object in the database by the source code effectively enhance operation security of the database and security of data in the database. In addition, the intermediate code and the machine code of the external routine are stored and managed by using a method controlled by the database, which effectively avoids risks such as deleting, replacing, or tampering the external routine when the intermediate code and the machine code of the external routine are managed, and not only improves rigorousness of management but also improves the security of the data in the database.

It may be clearly understood by a person skilled in the art that, for the purpose of convenient and brief description, for a detailed working process of the foregoing apparatus and unit, reference may be made to a corresponding process in the foregoing method embodiments, and details are not described herein again.

In the several embodiments provided in the present application, it should be understood that the disclosed apparatus and method may be implemented in other manners. For example, the described apparatus embodiment is merely exemplary. For example, the unit division is merely logical function division and may be other division in an actual implementation. For example, a plurality of units or components may be combined or integrated into another system, or some features may be ignored or not performed. Furthermore, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to an actual need to achieve the objectives of the solutions of the embodiments.

In addition, functional units in the embodiments of the present invention may be integrated into one processing unit, or each of the units may exist alone physically, or two or more units are integrated into one unit. The integrated unit may be implemented by hardware in addition to a software functional unit, or by hardware only.

A person of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes any medium that can store program code, such as a read-only memory (ROM), a random-access memory (RAM), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A data processing method, comprising:
receiving, by a receiver, source code of an external routine, wherein the source code of the external routine is compiled using an advanced programming language;
compiling, by a processor coupled to the receiver, the source code to obtain intermediate code, wherein the intermediate code is a byte stream identifiable to a plurality of virtual machines on a plurality of different operating platforms;
converting, by the processor and according to an instruction set on one of the operating platforms, the intermediate code into machine code capable of running on the one of the operating platforms;
storing, in a memory coupled to the processor, the machine code to a database;
receiving, by the receiver and from a second piece of user equipment, a request for invoking the external routine;
determining, by the processor and according to the request for invoking the external routine, whether the second piece of user equipment has permission to invoke the external routine;
invoking, according to a target name and a target address, the intermediate code of the external routine when the intermediate code of the external routine is invoked; and
running, by the processor, the machine code so as to invoke the external routine from the database when the second piece of user equipment has the permission to invoke the external routine.

2. The data processing method according to claim 1, wherein before receiving the source code of the external routine, the method further comprises:
receiving, by the receiver, a database access request from a first piece of user equipment that sends the source code of the external routine;
determining, by the processor and according to the database access request, whether the first user equipment has permission to access the database; and
receiving, by the receiver, the source code of the external routine from the first piece of user equipment when the first piece of user equipment has the permission to access the database so as to convert the source code into the machine code and store the machine code to the database.

3. The data processing method according to claim 1, wherein before compiling the source code to obtain the intermediate code, the method further comprises:
checking, by the processor, whether a range of an object, in the database, accessed by the source code is in a preset range of the object accessed in the database; and
compiling, by the processor, the source code to obtain the intermediate code when the range of the object, in the database, accessed by the source code is in the preset range of the object accessed in the database.

4. The data processing method according to claim 1, wherein before compiling the source code to obtain intermediate code, the method further comprises:
checking, by the processor, whether an operation performed by the source code on an object in the database is a preset operation performed on the object in the database, wherein the operation comprises modifying, adding, or deleting the object; and
compiling, by the processor, the source code to obtain the intermediate code when the operation performed by the source code on the object in the database is the preset operation performed on the object in the database.

5. The data processing method according to claim 1, wherein after compiling the source code to obtain the intermediate code, the method further comprises storing the intermediate code to the database.

6. The data processing method according to claim 5, wherein after storing the intermediate code to the database, the method further comprises:
generating, by the processor, a target name of the intermediate code, wherein the target name is used to uniquely identify the intermediate code; and
generating, by the processor, a target address of the intermediate code, wherein the target address is an address of the intermediate code in the database.

7. A data processing apparatus, comprising:
a memory comprising a database;
a receiver coupled to the memory and configured to receive source code of an external routine, wherein the source code of the external routine is compiled using an advanced programming language; and
a processor coupled to the memory and configured to:
compile the source code to obtain intermediate code, wherein the intermediate code is a byte stream identifiable to a plurality of virtual machines on a plurality of different operating platforms;
convert, according to an instruction set on one of the operating platforms, the intermediate code into machine code capable of running on the one of the operating platforms; and
store the machine code to the database;
wherein the receiver is further configured to receive, from a second piece of user equipment, a request for invoking the external routine, and
wherein the processor is further configured to:
determine, according to the request for invoking the external routine, whether the second user equipment has permission to invoke the external routine;
invoking, according to a target name and a target address, the intermediate code of the external routine when the intermediate code of the external routine is invoked; and
execute the machine code when determining that the second user equipment has the permission to invoke the external routine so as to invoke the external routine from the database.

8. The data processing apparatus according to claim 7, wherein the receiver is further configured to:
receive a database access request from a first piece of user equipment that sends the source code of the external routine;
determine, according to the database access request, whether the first piece of user equipment has permission to access the database; and
receive the source code of the external routine from the first piece of user equipment so as to convert the source code into the machine code and store the machine code to the database when determining that the first user equipment has the permission to access the database.

9. The data processing apparatus according to claim 7, wherein the processor is further configured to:
check whether a range of an object, in the database, accessed by the source code is in a preset range of the object accessed in the database; and
compile the source code to obtain the intermediate code when determining that the range of the object, in the database, accessed by the source code is in the preset range of the object accessed in the database.

10. The data processing apparatus according to claim 7, wherein the processor is further configured to:
check whether an operation performed by the source code on an object in the database is a preset operation performed on the object in the database, wherein the operation comprises modifying, adding, or deleting the object; and
compile the source code to obtain the intermediate code when determining that the operation performed by the source code on the object in the database is the preset operation performed on the object in the database.

11. The data processing apparatus according to claim 7, wherein the processor is further configured to store the intermediate code to the database.

12. The data processing apparatus according to claim 11, wherein the processor is further configured to:
generate a target name of the intermediate code, wherein the target name is used to uniquely identify the intermediate code; and
generate a target address of the intermediate code, wherein the target address is used to identify an address of the intermediate code in the database.

13. A non-transitory computer readable medium having computer-executable instructions stored thereon, the computer executable instructions comprising instructions for:
receiving source code of an external routine, wherein the source code of the external routine is compiled using an advanced programming language;
compiling the source code to obtain intermediate code, wherein the intermediate code is a byte stream identifiable to a plurality of virtual machines on a plurality of different operating platforms;
converting, according to an instruction set on one of the operating platforms, the intermediate code into machine code capable of running on the one of the operating platforms;
storing the machine code to a database;
receiving, by the receiver and from a second piece of user equipment, a request for invoking the external routine;
determining, by the processor and according to the request for invoking the external routine, whether the second piece of user equipment has permission to invoke the external routine;
invoking, according to a target name and a target address, the intermediate code of the external routine when the intermediate code of the external routine is invoked; and
executing the machine code so as to invoke the external routine from the database when the second piece of user equipment has the permission to invoke the external routine.

14. The non-transitory computer readable medium of claim 13, wherein the computer executable instructions further comprise instructions for receiving a database access request from a user equipment that sends the source code of the external routine.

15. The non-transitory computer readable medium of claim 13, wherein the computer executable instructions further comprise instructions for determining, according to a database access request received from a user equipment, whether the user equipment has permission to access the database, wherein the database access request comprises the source code of the external routine.

16. The non-transitory computer readable medium of claim 13, wherein the computer executable instructions further comprise instructions for receiving the source code of the external routine from a user equipment in response to determining that the user equipment has permission to access the database.

17. The non-transitory computer readable medium of claim 13, wherein the computer executable instructions further comprise instructions for checking whether a range of an object, in the database, accessed by the source code is in a preset range of the object accessed in the database.

18. The non-transitory computer readable medium of claim 13, wherein the computer executable instructions further comprise instructions for compiling the source code to obtain the intermediate code when a range of a requested object, in the database, accessed by the source code is in a preset range of the requested object accessed in the database.

\* \* \* \* \*